United States Patent
Osaka

(10) Patent No.: US 8,873,082 B2
(45) Date of Patent: Oct. 28, 2014

(54) PRINTING APPARATUS, PRINTING CONTROL METHOD, AND STORAGE MEDIUM FOR CONTROLLING PRINTING PERFORMED BY VARIABLE DATA PRINTING

(75) Inventor: Hitoshi Osaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 13/406,136

(22) Filed: Feb. 27, 2012

(65) Prior Publication Data

US 2012/0224192 A1 Sep. 6, 2012

(30) Foreign Application Priority Data

Mar. 2, 2011 (JP) ................. 2011-045474

(51) Int. Cl.
*G06F 3/12* (2006.01)

(52) U.S. Cl.
CPC ............ *G06F 3/1285* (2013.01); *G06F 3/1234* (2013.01); *G06F 2206/1514* (2013.01); *G06F 3/1243* (2013.01); *G06F 3/1204* (2013.01); *G06F 3/121* (2013.01)
USPC ....... 358/1.14; 358/1.15; 358/1.13; 358/1.18; 358/1.2; 399/81

(58) Field of Classification Search
CPC ... G06F 3/1243; G06F 3/1261; G06F 3/1234; G06F 3/1225
USPC ....................... 358/1.2, 1.12–1.18; 399/45, 81
See application file for complete search history.

(56) References Cited

U.S. PATENT DOCUMENTS

| | | | | |
|---|---|---|---|---|
| 6,233,414 B1* | 5/2001 | Farrell | | 399/81 |
| 6,512,599 B1* | 1/2003 | Hattori | | 358/442 |
| 6,930,796 B1* | 8/2005 | Matsuura et al. | | 358/1.2 |
| 8,102,546 B2* | 1/2012 | Ebuchi | | 358/1.14 |
| 2002/0063881 A1* | 5/2002 | Nakata et al. | | 358/1.14 |
| 2004/0156061 A1* | 8/2004 | Kobayashi | | 358/1.12 |
| 2005/0232656 A1* | 10/2005 | Asai et al. | | 399/130 |
| 2005/0270565 A1* | 12/2005 | Shima et al. | | 358/1.15 |
| 2006/0209318 A1* | 9/2006 | Tonegawa | | 358/1.2 |
| 2008/0180711 A1* | 7/2008 | Ebuchi | | 358/1.12 |
| 2010/0053668 A1* | 3/2010 | Huh et al. | | 358/1.15 |
| 2011/0032569 A1* | 2/2011 | Ohashi | | 358/1.15 |
| 2011/0107432 A1* | 5/2011 | Oomori | | 726/27 |
| 2011/0149314 A1* | 6/2011 | Kim | | 358/1.9 |
| 2012/0163852 A1* | 6/2012 | Kimura | | 399/82 |

FOREIGN PATENT DOCUMENTS

| | | |
|---|---|---|
| JP | 2000-62292 A | 2/2000 |
| JP | 2005-59983 A | 3/2005 |

* cited by examiner

*Primary Examiner* — Dennis Dicker
(74) *Attorney, Agent, or Firm* — Canon USA, Inc. IP Division

(57) ABSTRACT

A printing apparatus that is configured to, in order to efficiently execute printing by suitably skipping a page that is not to be printed, receive information about an attribute of paper to be skipped without printing, and based on information about the received attribute, print a page that does not use paper having the attribute and skip printing of a page that uses paper having the attribute.

16 Claims, 15 Drawing Sheets

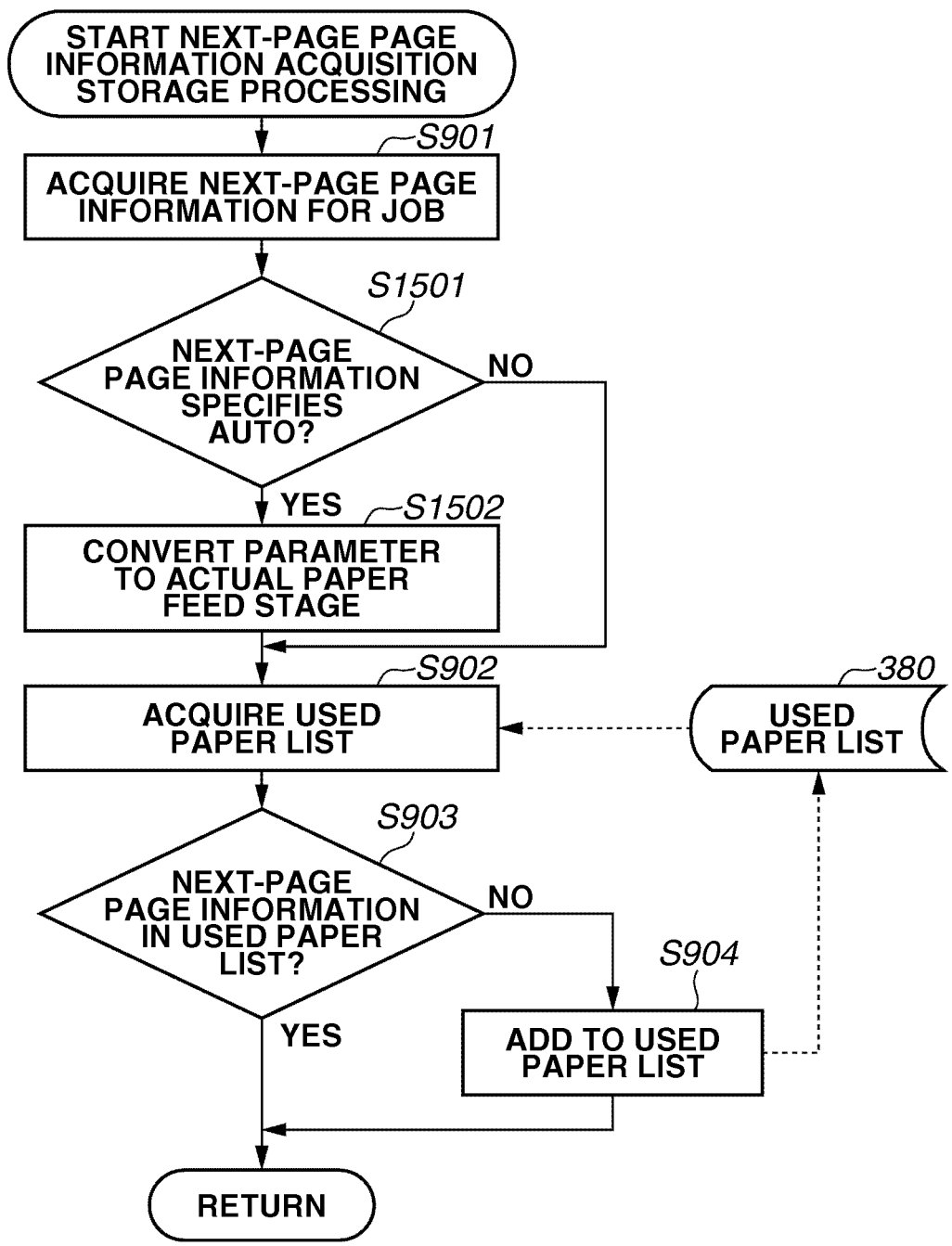

PRINTING APPARATUS, PRINTING CONTROL METHOD, AND STORAGE MEDIUM FOR CONTROLLING PRINTING PERFORMED BY VARIABLE DATA PRINTING

BACKGROUND OF THE INVENTION

1. Field of the Invention

The present invention relates to a printing apparatus, a printing control method, and a storage medium.

2. Description of the Related Art

Conventionally, offset printing using a plate has been employed to obtain a print product. Recently, in addition to the offset printing, plateless digital printing methods represented by an electrophotographic method are also used.

Characteristics of plate offset printing are that the costs for high volume printing are low, and that the printing speed is fast. On the other hand, characteristics of plateless digital printing is that it enables variable page printing, represented by variable data printing (VDP), for outputting different content on a per-page basis.

In VDP, the output content is different depending on the intended party, such as in direct mailing. In VDP, printing is performed by arranging information pieces in database having the same format but different contents, such as destination addresses, to a layout prepared in advance.

For example, in VDP, simply the destination address may be different. For another example, in VDP, an image (content) or paper to be used may be different according to information unique to the receiving party, which can cause the page number to change. A VDP job is configured as one large job including many records.

In general digital printing, a job can be cancelled on the printing apparatus. For example, when an operator realizes after printing has started that there is an error in the job contents, the operator can cancel the job. In addition, if a problem such a paper jam occurs during printing, the printing apparatus automatically stops processing of the job.

However, in VDP, the size of the job may be very large, so that it can take a very long time to input the job again into the printing apparatus. Therefore, cancelling a job leads to a substantial decrease in printing productivity.

Japanese Patent Application Laid-Open No. 2000-62292 discusses a method that, when a paper-related error occurs in a printing apparatus, can cancel the processing of the affected job and preferentially output the other input jobs that are not affected by the paper-related error. Japanese Patent Application Laid-Open No. 2005-59983 discusses a method for continuing printing of a job that is interrupted because some types of paper ran out the printing apparatus by using substitute paper.

However, during printing the operator may set the wrong paper in a paper feed stage in the printing apparatus. For example, this can occur when the paper set in a predetermined paper feed stage and used for a job turns out to be orange paper mistakenly set by the operator, when red paper should have been set.

Since the printing apparatus cannot recognize such a paper setting mistake, the operator only learns of the mistake after printing has actually started.

For example, consider a case in which "blue" paper is meant to be set in a first paper feed stage and "red" paper is meant to be set in a second paper feed stage, but after printing has started the operator realizes that the paper actually set in the second paper feed stage is not "red", but is "orange".

In this case, according to the technique discussed in Japanese Patent Application Laid-Open No. 2000-62292, the operator has to reset the correct paper in the second paper feed stage and re-input the job. Further, if the operator does not wish to print using substitute paper, even in the technique discussed in Japanese Patent Application Laid-Open No. 2005-59983, the operator has to cancel the job, reset the correct paper in the second paper feed stage, and re-input the job. If the job size is very large, this means that such a job has to be re-input, which can cause printing productivity to decrease.

SUMMARY OF THE INVENTION

The present invention is directed to a technique capable of cancelling printing more suitably.

According to an aspect of the present invention, a printing apparatus includes a receiving unit configured to receive an attribute of paper to be skipped without printing, and a printing unit configured to, based on the attribute received by the receiving unit, print a page that does not use paper having the attribute, and skip printing of a page that uses paper having the attribute.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 15 illustrates an example of a flowchart relating to next-page page information acquisition storage processing.

DESCRIPTION OF THE EMBODIMENTS

Various exemplary embodiments, features, and aspects of the invention will be described in detail below with reference to the drawings.

A first exemplary embodiment relates to an apparatus, a system, a method, and a program for partially cancelling printing. A printing control method will now be described which partially cancels printing performed by VDP by using as an example a configuration in which a printing apparatus performs printing while switching a plurality of types of paper (an example of a recording medium) set therein during output of a job.

Figure 1:
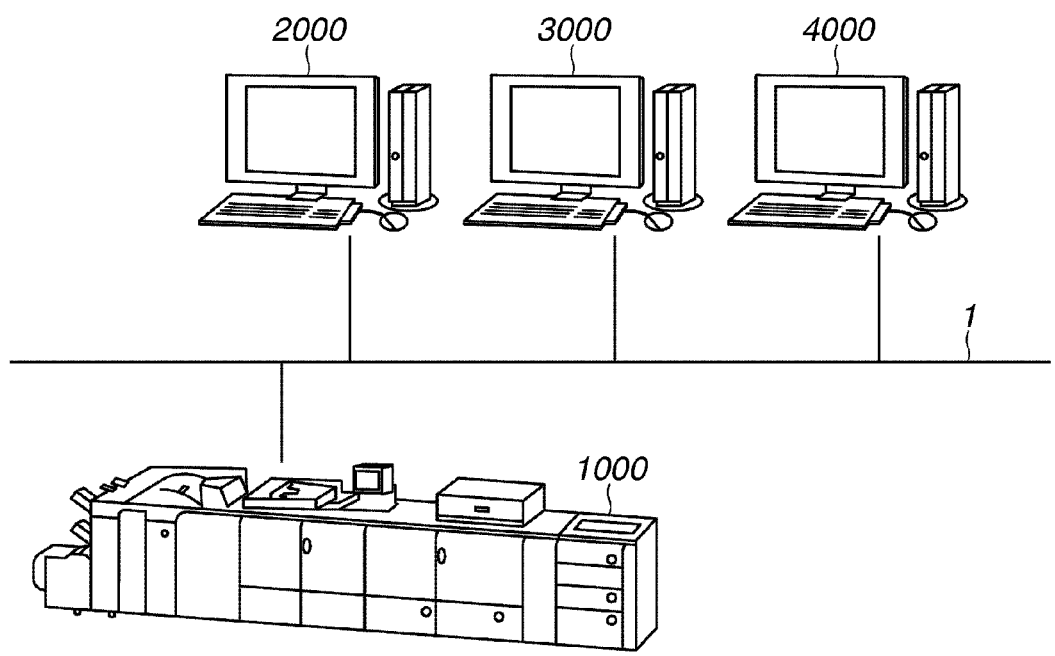
FIG. 1 illustrates an example of a printing system configuration.

FIG. 1 illustrates an example of the printing system configuration according to the present exemplary embodiment. The printing system is configured from a printing apparatus 1000 and a plurality of host computers (2000, 3000, and 4000). The printing apparatus 1000 and the plurality of host computers are communicably connected via a network 1. Each of the plurality of host computers transmits a print job (or a job) to the printing apparatus 1000 via the network 1.

Figure 2:
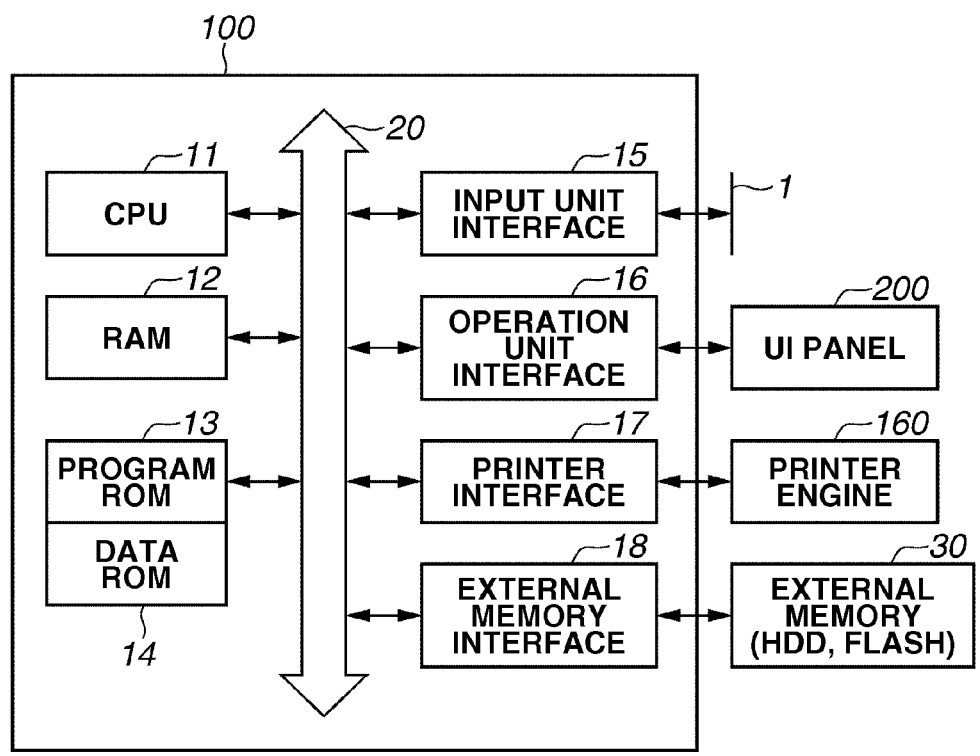
FIG. 2 illustrates an example of a hardware configuration of a controller.

FIG. 2 illustrates an example of a hardware configuration of a controller 100 included in the printing apparatus 1000. The controller 100 is an example of an information processing apparatus (computer). A central processing unit (CPU) 11 operates based on programs stored in a program read-only memory (ROM) 13. A random access memory (RAM) 12 is used as a main memory when the CPU 11 is operating, and is also used as an area for temporarily storing information. A data ROM 14 stores fixed information, such as a font that is called when an application of a program executed by the CPU 11 is operated.

An input unit interface 15 receives information about a print job, for example, from the respective host computers connected to the network 1. An operation unit interface 16 connects a user interface (UI) panel 200 to the controller 100. A printer interface 17 connects a printer engine 160 and the controller 100.

An external memory interface 18 connects an external memory 30, such as a hard disk and a flash memory, with the controller 100. The external memory 30 is an example of a storage unit for storing various pieces of information. Each of the units 11 to 18 is communicably connected with one another via a system bus 20. Further, peripheral devices such as the external memory 30 can be provided in the printing apparatus 1000, or can be communicably connected to the printing apparatus 1000.

Figure 3:
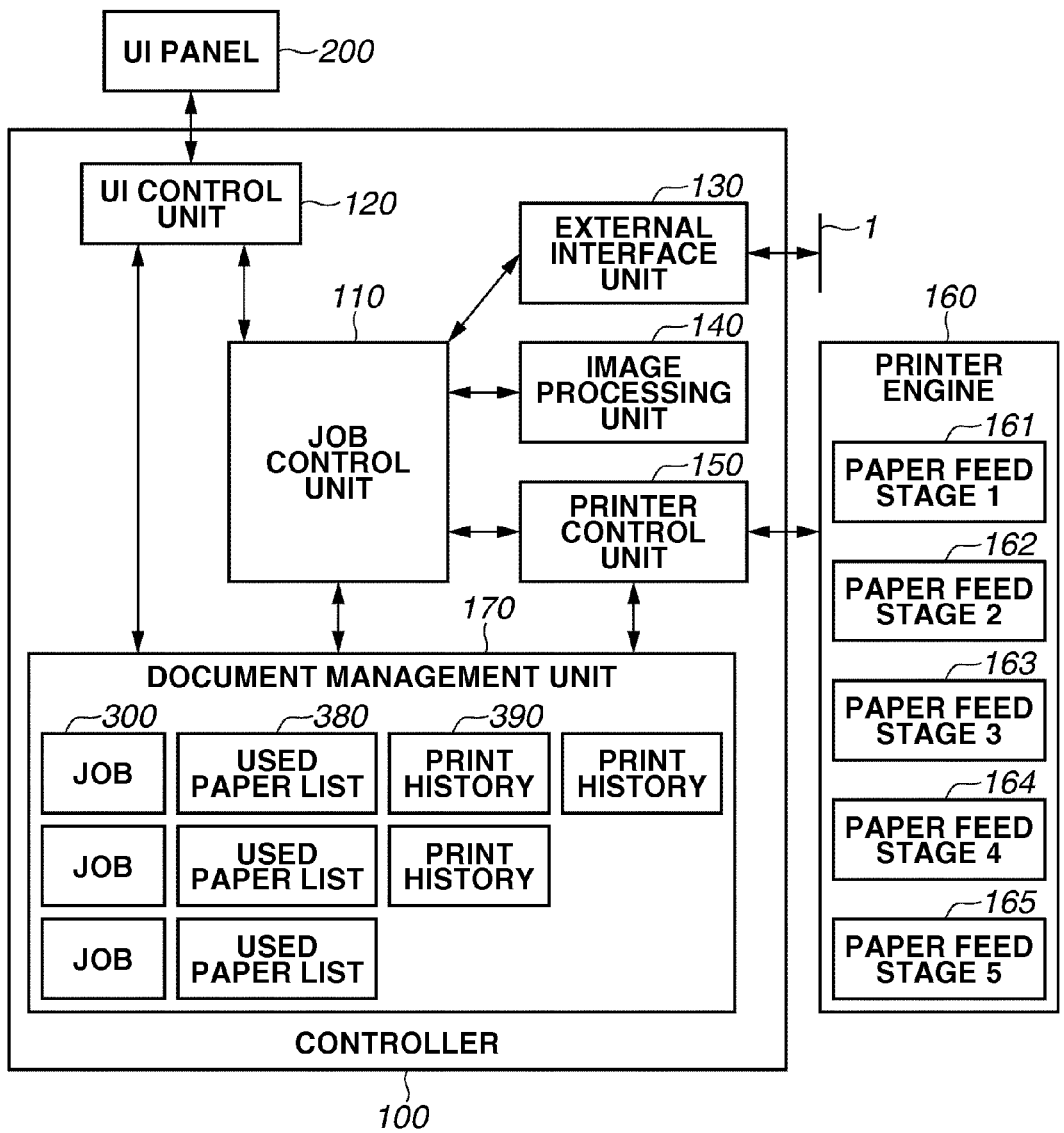
FIG. 3 illustrates an example of a function configuration of the controller, and an example of a configuration relating to the function configuration.

FIG. 3 illustrates an example of the function configuration of the controller 100 included in the printing apparatus 1000, and an example of the configuration relating to the function configuration.

A job control unit 110 controls the processing relating to a job. A UI control unit 120 is an example of a receiving unit that receives various information pieces. The UI control unit 120 controls the operation unit interface 116, and communicates with the UI panel 200. An external interface unit 130 controls the input unit interface 15.

An image processing unit 140 generates an image of a page in a printing-related job. A printer control unit 150 controls the printer interface 17. The printer engine 160 is controlled by the printer control unit 150 via the printer interface 17. Paper feed stages 161 to 165 are an example of a paper feed unit for storing paper.

A document management unit 170 stores and manages jobs. A job 300 indicates a job that is currently being processed or a job that has been processed and stored. A used paper list 380 is list information including information about the paper to be used by the job 300. A print history 390 is information about the history when the job 300 was printed.

The job 300, the used paper list 380, and the print history 390 are stored and managed in the external memory 30 by the document management unit 170. The functions of the printing apparatus 1000 and processing relating to the below-described flowcharts are realized by the CPU 11 reading and executing programs relating to the respective modules (110, 120, 130, 140, 150, and 170) from the program ROM 13.

Figure 4:
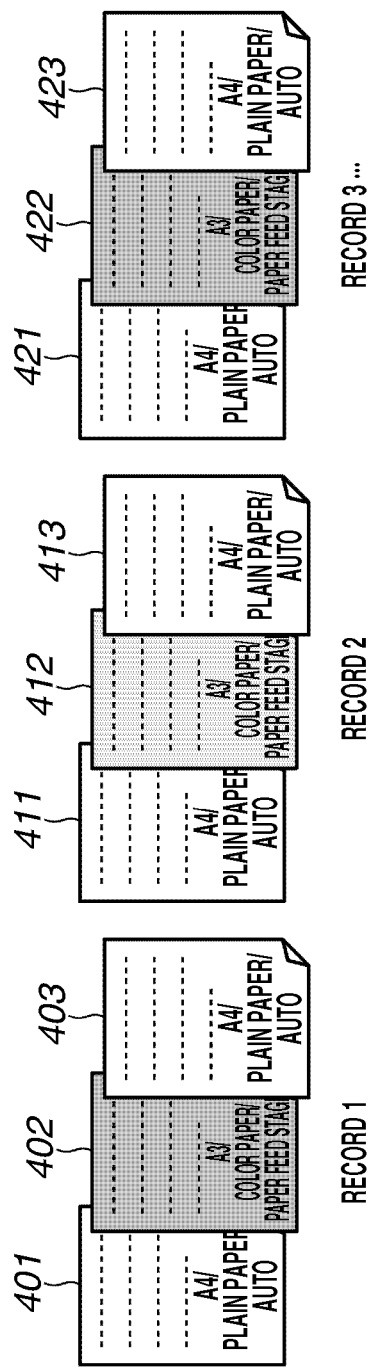
FIG. 4 illustrates an example of job contents.

FIG. 4 illustrates an example of job contents. FIG. 4 illustrates pages (401, 403, 411, 413, 421, and 423) that are specified "to be fed from a paper feed stage determined as A4 size/plain paper/auto (automatically)" as paper information. Further, FIG. 4 illustrates pages (402 and 422) that are specified as "A4 size/color paper/to be fed from a paper feed stage 1" and a page 412 that is specified as "A4 size/color paper/to be fed from a paper feed stage 2". Color paper is an example of the paper.

A record 1 is configured from the combination of page 401, page 402, and page 403. A record 2 is configured from the combination of page 411, page 412, and page 413. A record 3 is configured from the combination of page 421, page 422, and page 423. A plurality of records is thus configured from a combination of pages, which together form one job.

Figure 5:
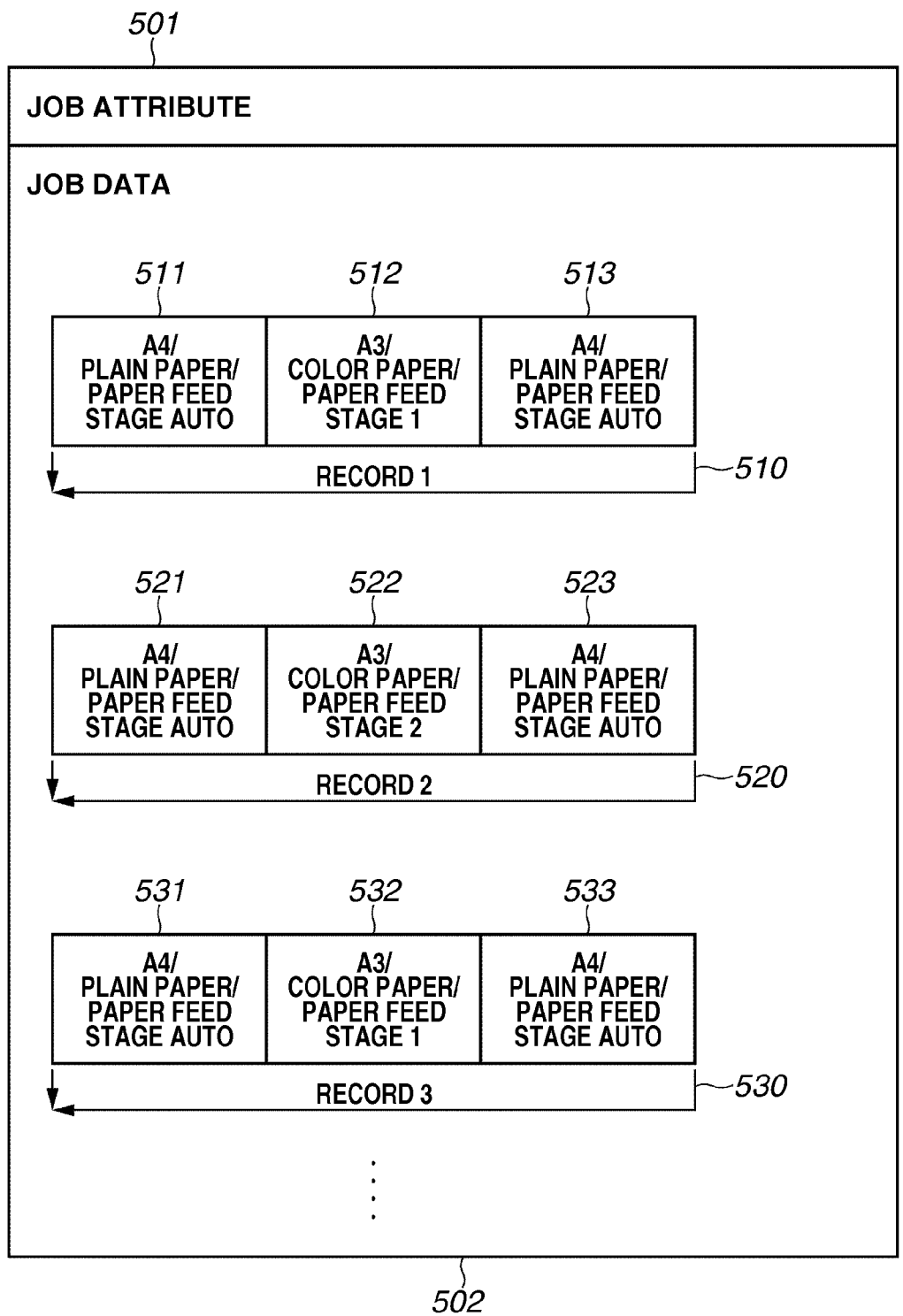
FIG. 5 illustrates an example of an internal configuration of a job.

FIG. 5 illustrates an example of the internal configuration of a job. Job attribute data 501 includes attribute data relating to the whole job. Job page data 502 includes information pieces about a plurality of records, such as a record 510, a record 520, and a record 530.

The page data (511, 512, 513, 521, 522, 523, 531, 532, and 533) constituting the records represent data corresponding to the pages (401, 402, 403, 411, 412, 413, 421, 422, and 423) illustrated in FIG. 4 respectively. Each page data includes information about the paper of each page (information about attributes such as paper size, paper type, and paper feed stage).

Figure 6:
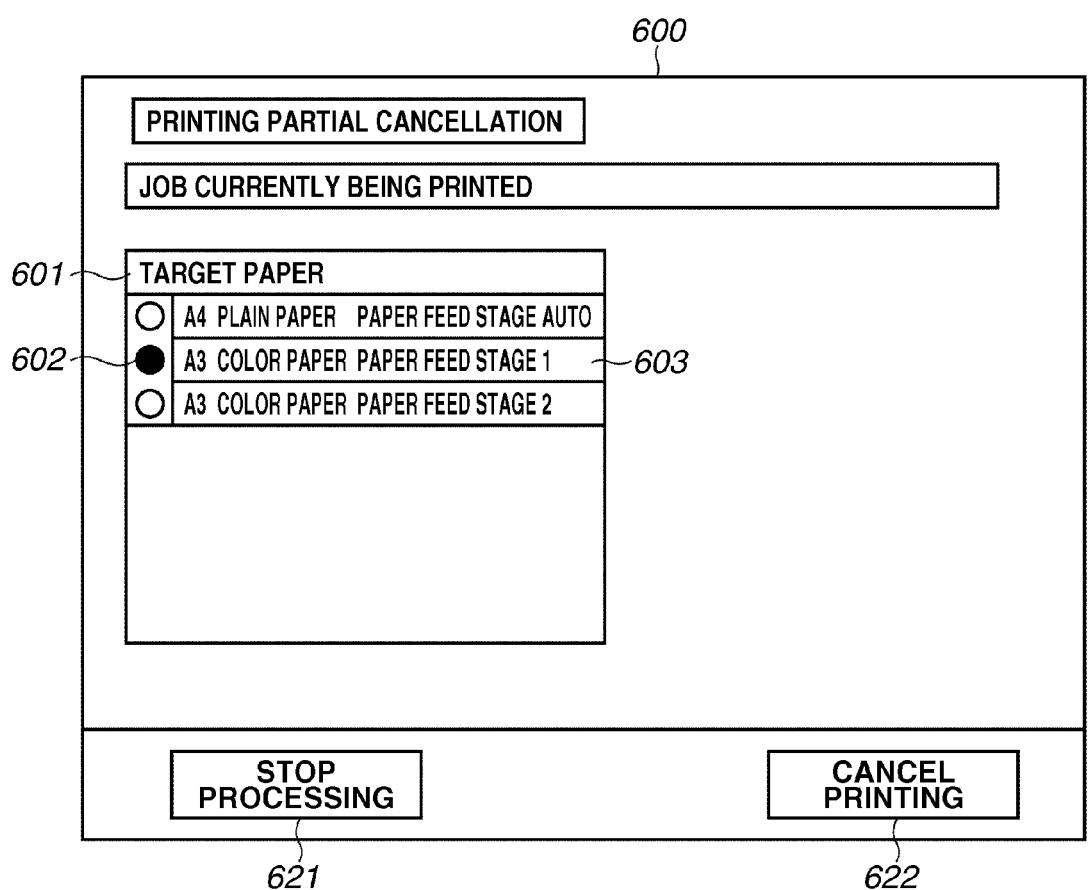
FIG. 6 illustrates an example of a user interface (UI).

FIG. 6 illustrates an example of a UI for instructing printing cancellation (i.e., a cancel specification screen 600). The cancel specification screen 600 is displayed on the UI panel 200.

An input area 601 is an example of an area for inputting information about the paper that will be a target of cancellation. The input area 601 includes a radio button 602 corresponding to information about the paper displayed as a list in a list display section 603. Information about the paper to be a target of cancellation is received by selecting the radio button 602 and pressing a cancel printing button 622.

A stop processing button 621 receives an instruction to stop printing cancellation. The cancel printing button 622 receives an instruction to cancel printing based on the contents specified on the cancel specification screen 600.

Figure 7:
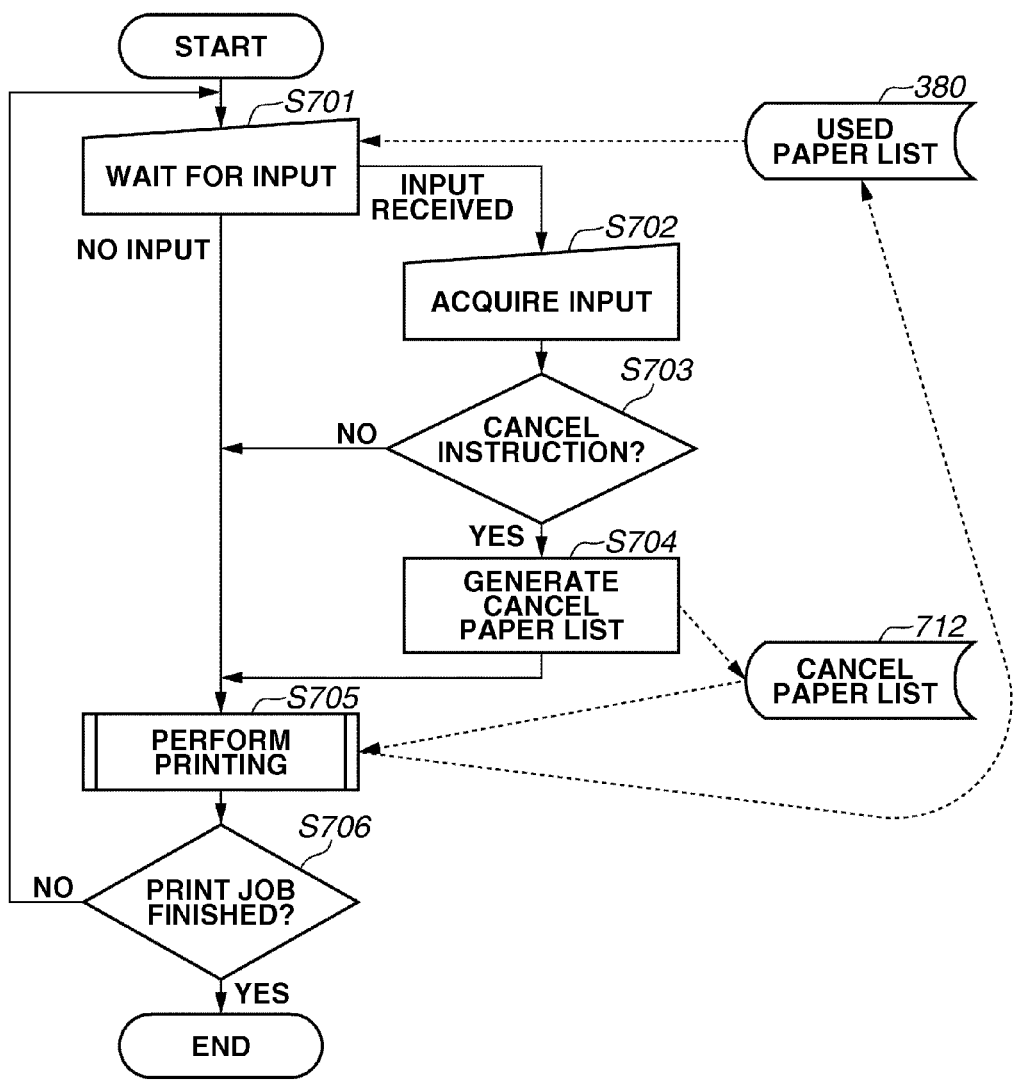
FIG. 7 illustrates an example of a flowchart relating to partial cancellation processing.

FIG. 7 illustrates an example of a flowchart relating to partial cancellation processing for cancelling a part of printing for a job by the printing apparatus 1000. In FIG. 7, processing mainly executed by the UI control unit 120 will be described.

The UI control unit 120 can be realized by the CPU 11, the RAM 12, the program ROM 13, the data ROM 14 and the like. In other words, the processing illustrated in FIG. 7 is realized by the CPU 11 executing a program stored in the program ROM 13 that relates to the processing illustrated in the flowchart in FIG. 7.

The processing from a state in which a list of the jobs currently being printed is displayed on the UI panel 200 by the UI control unit 120, and a job has been selected from among the list will be described based on the flowchart illustrated in FIG. 7.

In step S701, when a job is selected in response to a user operation on the UI panel 200, the UI control unit 120 displays the cancel specification screen 600 on the UI panel 200 and waits for an input. In step S701, the UI control unit 120 acquires the used paper list 380 from the external memory 30, and displays the information about the paper on the cancel specification screen 600.

If an instruction is received in step S701 (INPUT RECEIVED in step S701), then in step S702, the UI control unit 120 acquires the received contents (input result). In step S703, the UI control unit 120 determines whether the input result is an instruction to partially cancel printing (whether the cancel printing button 622 is pressed).

If the UI control unit 120 determines that the input result is the cancel instruction (YES in step S703), in step S704, the UI control unit 120 generates a cancel paper list 712 based on the information about the paper corresponding to the specified radio button 602, and stores the generated cancel paper list 712 in the external memory 30. The cancel paper list 712 is referred to in print processing (step S705), and is used for specifying the paper for which a cancellation instruction is made.

On the other hand, if an instruction is not received in step S701 (NO INPUT in step S701), in step S705, print processing, which will be described below, continues without stopping, in parallel with the processing performed by the UI control unit 120.

In step S706, the UI control unit 120 determines whether the print processing has been performed until the end of the job (whether the print job is finished). If the UI control unit 120 determines that the print processing has been performed until the end of the job (YES in step S706), the processing finishes. On the other hand, if the UI control unit 120 determines that the print processing has not been performed until the end of the job (NO in step S706), the processing returns to step S701.

Figure 8:
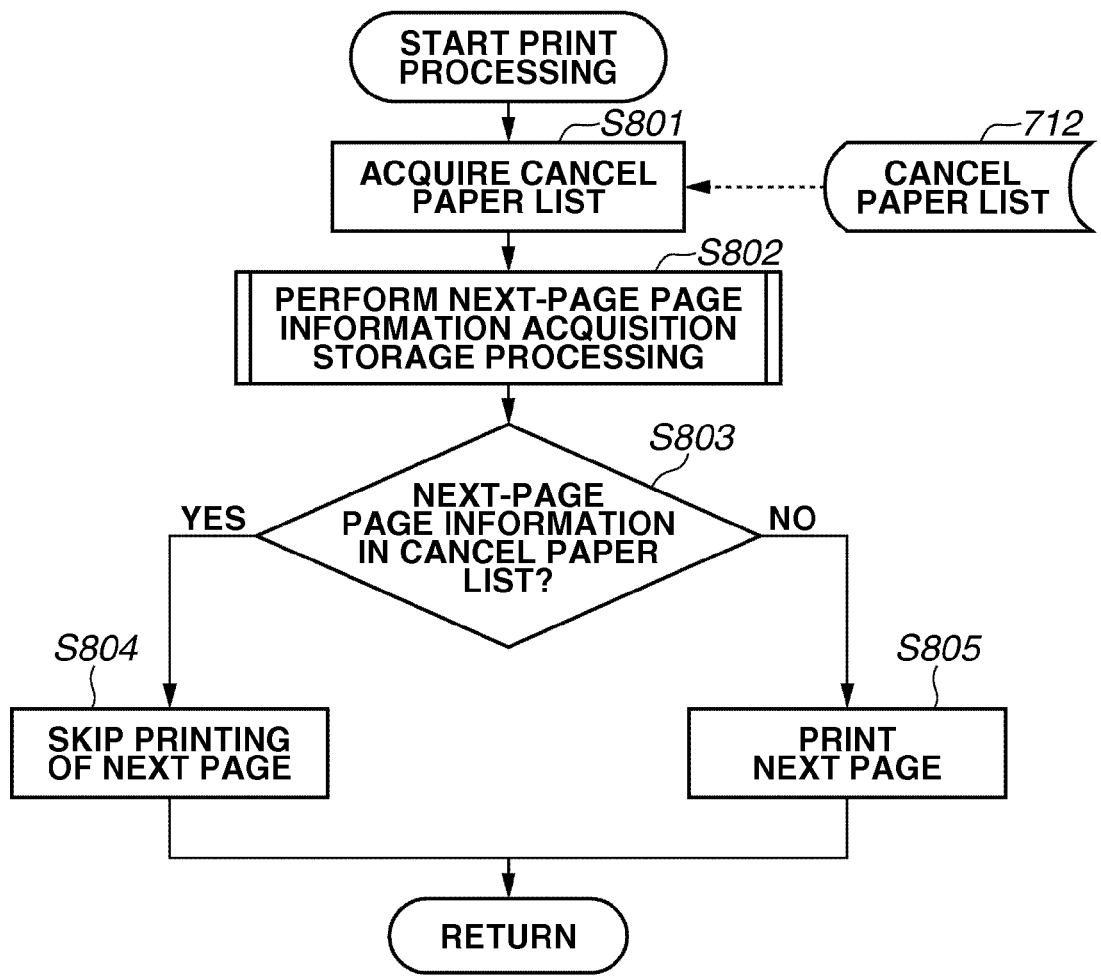
FIG. 8 illustrates an example of a flowchart relating to print processing.

FIG. 8 illustrates an example of a flowchart relating to print processing performed by the job control unit 110 in the printing apparatus 1000.

The job control unit 110 can be realized by the CPU 11, the RAM 12, the program ROM 13, the data ROM 14 and the like. In other words, the processing illustrated in FIG. 8 is realized by the CPU 11 executing a program stored in the program ROM 13 that relates to the processing illustrated in the flowchart in FIG. 8. The print processing will now be described based on the flowchart illustrated in FIG. 8.

First, in step S801, the job control unit 110 acquires the cancel paper list 712 from the external memory 30. The information about the paper that is the printing cancellation target as described above is written in the cancel paper list 712.

Then, in step S802, the job control unit 110 performs next-page page information acquisition storage processing which will be described below. In next-page page information acquisition storage processing, the job control unit 110 acquires page information about the next page of the job currently being printed, for example. The acquired page information is information about the paper that is included in the page data (information about the paper size, the paper type, and the paper feed stage).

Next, in step S803, the job control unit 110 determines whether the acquired next-page page information is included in the cancel paper list 712 by referring to the acquired next-page page information and the cancel paper list 712 acquired in step S801. If it is determined that the next-page page information is included in the cancel paper list 712 (YES in step S803), in step S804, the job control unit 110 skips printing of the next page. On the other hand, if it is determined that the next-page page information is not included in the cancel paper list 712 (NO in step S803), in step S805, the job control unit 110 executes printing of the next page.

Figure 9:
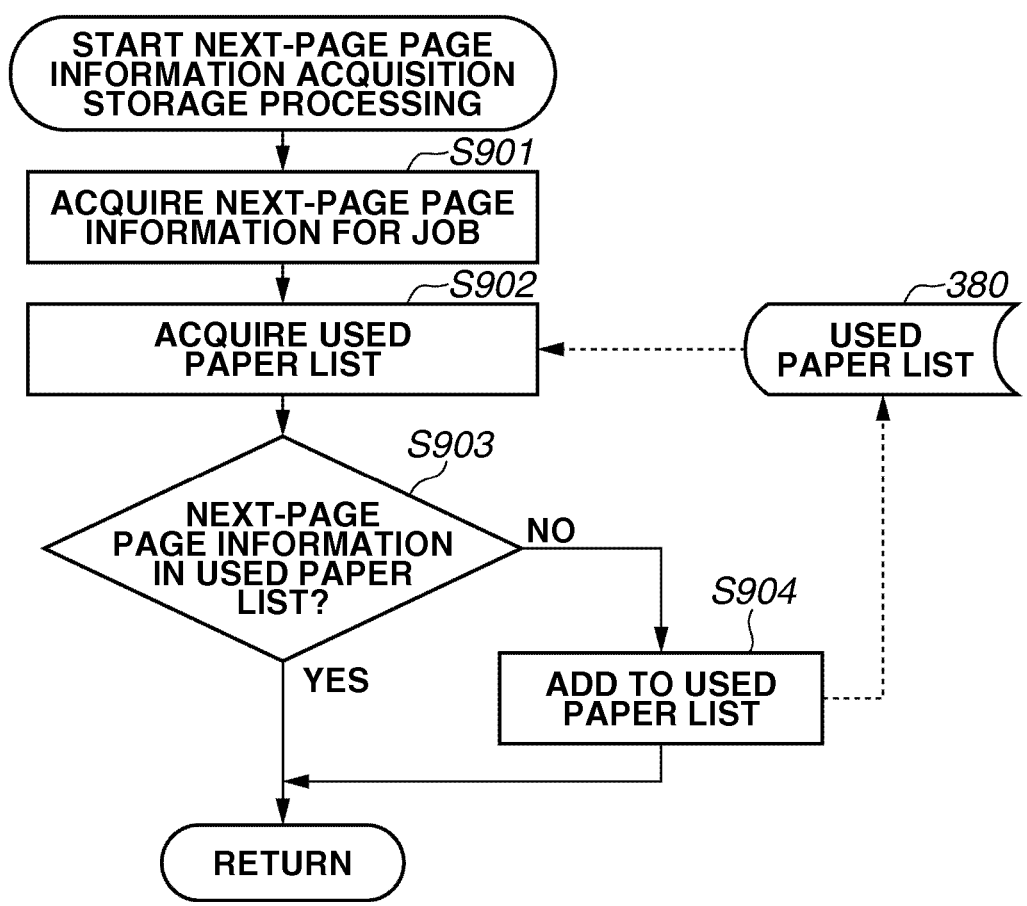
FIG. 9 illustrates an example of a flowchart relating to next-page page information acquisition storage processing.

FIG. 9 illustrates an example of a flowchart relating to the next-page page information acquisition storage processing performed by the job control unit 110 in the printing apparatus 1000. The processing illustrated in FIG. 9 is realized by the CPU 11 executing a program stored in the program ROM 13 that relates to the processing illustrated in the flowchart in FIG. 9. The next-page page information acquisition storage processing will now be described based on the flowchart illustrated in FIG. 9.

First, in step S901, the job control unit 110 acquires the next-page page information for the current job that is being printed. Then, in step S902, the job control unit 110 acquires the used paper list 380 from the external memory 30.

Next, in step S903, the job control unit 110 determines whether the next-page page information acquired in step S901 is already included in the used paper list 380 acquired in step S902.

If it is determined that the next-page page information is not included in the used paper list 380 (NO in step S903), in step S904, the job control unit 110 adds the page information acquired in step S901 (information about the paper) to the used paper list 380, and then finishes the next-page page information acquisition storage processing. On the other hand, if it is determined that the next-page page information is included in the used paper list 380 (YES in step S903), the job control unit 110 finishes the next-page page information acquisition storage processing.

The used paper list 380 updated in this processing is used by the UI control unit 120 in order to display the information about the paper that can be specified as a cancellation target in a list format in the flowchart illustrated in FIG. 7.

After printing has thus been partially cancelled, the user needs to perform reprinting by resetting the correct paper for only the cancelled page in the printing apparatus 1000. For the reprinting, an arbitrary configuration can be employed.

For example, to perform partial reprinting, the job control unit 110 generates a job for the page for which printing was cancelled, and stores the generated job in the external memory 30 via the document management unit 170. Subsequently, when specifying reprinting, the user can specify the reprinting target by operating the UI that receives the specification regarding which of the jobs stored in the external memory 30 is to be reprinted.

Then, when the user issues a reprinting instruction via the UI, the job control unit 110 prints (outputs) only the page that used the specified paper.

More specifically, according to the present exemplary embodiment, since the printing of a part of a job can be cancelled, a situation in which printing productivity substantially decreases can be avoided.

In the first exemplary embodiment, a configuration is described in which printing cancellation can be realized in single page units. However, in an actual practice, when printing is cancelled in single page units, it may take some work to rearrange the reprinted paper and the print product that was not cancelled in the correct order.

Therefore, in a second exemplary embodiment, an example of a configuration is described which can solve this issue. In the present exemplary embodiment, parts having the same configuration as in the first exemplary embodiment are denoted using the same reference numerals, and a description thereof is omitted as appropriate.

Figure 10:
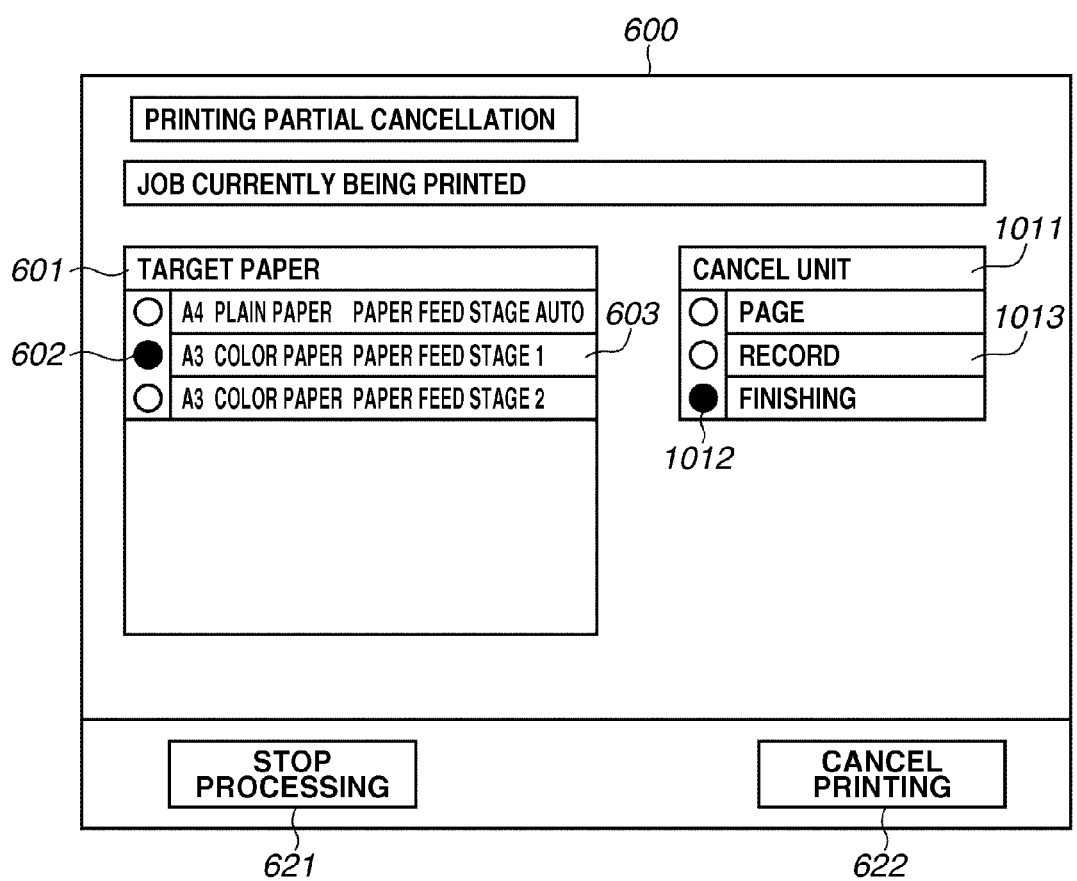
FIG. 10 illustrates an example of a UI.

FIG. 10 illustrates an example of a UI for instructing printing cancellation (i.e., the cancel specification screen 600).

An input area 1011 is an example of an area for inputting information about the processing unit that will be the target of cancellation (cancellation unit). The cancel specification screen 600 includes a radio button 1202 and a list display section 1203. Information about the cancellation unit is received by selecting the radio button 1012 corresponding to the information about the cancellation unit displayed in a list format in the list display section 1013, and pressing the cancel printing button 622.

Examples of the cancellation unit include "page", "record", and "finishing". Similar to the first exemplary embodiment, the "page" unit is a cancellation unit for cancelling printing in units of one page. The "record" unit is a cancellation unit for cancelling printing of one record as a single unit. The "finishing" unit is a cancellation unit for cancelling printing of, for example, a bundle of pages to be stapled as a single unit. Finishing is not limited to stapling. For example, finishing may refer to some other process that groups a plurality of pages together.

Cancellation of printing based on "record" and "finishing" cancellation units will now be described.

Although the flowchart illustrated in FIG. 7 does not change even when the UI illustrated in FIG. 10 is used, the information stored in the cancel paper list 712 additionally includes the information about cancellation units. In the present exemplary embodiment, the UI control unit 120 stores the information about the cancellation unit specified in the input area 1011 as the cancel paper list 712 paired with (associated with) the information about the paper specified in the input area 601. The cancel paper list 712 is used in print processing (step S705).

Figure 11:
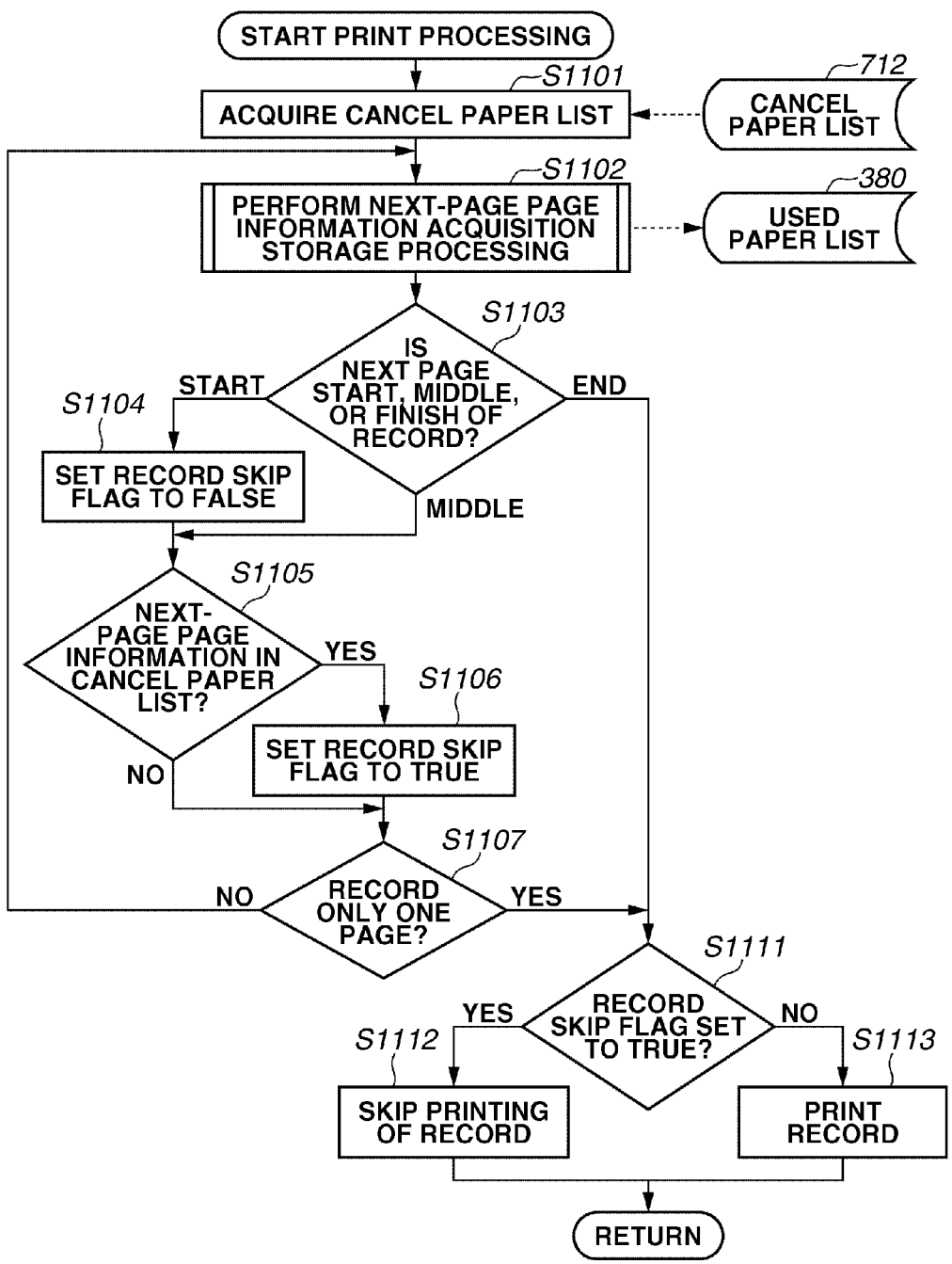
FIG. 11 illustrates an example of a flowchart relating to print processing.

FIG. 11 illustrates an example of a flowchart relating to print processing performed by the job control unit 110 in the printing apparatus 1000. However, FIG. 11 illustrates an example in which "record" is selected as the cancellation unit on the UI illustrated in FIG. 10. The print processing will now be described based on the flowchart illustrated in FIG. 11.

First, in step S1101, the job control unit 110 acquires the cancel paper list 712 from the external memory 30. In this example, the cancel paper list 712 includes the cancellation unit information "record". The flowchart illustrated in FIG. 11 illustrates the print processing that is performed when the cancellation unit is specified as "record".

Then, in step S1102, the job control unit 110 performs next-page page information acquisition storage processing. In next-page page information acquisition storage processing, as described above, the job control unit 110 acquires the page information about the next page of the job currently being printed.

Next, in step S1103, the job control unit 110 determines whether the next page is a start page, a mid-page, or an end page of the record based on information indicating a separation of the record included in the job.

If it is determined that the next page is a start page (START in step S1103), in step S1104, the job control unit 110 sets a record skip flag to FALSE, and the processing proceeds to step S1105.

If it is determined that the next page is a mid page (MIDDLE in step S1103), the processing proceeds to step S1105.

In step S1105, the job control unit 110 determines whether the next-page page information (information about the paper) is included in the cancel paper list 712 by referring to the acquired page information and the cancel paper list 712 acquired in step S1101. If it is determined that the next-page page information is included in the cancel paper list 712 (YES in step S1105), in step S1106, the job control unit 110 sets the record skip flag to TRUE, and the processing proceeds to step S1107. On the other hand, if it is determined that the next-page page information is not included in the cancel paper list 712 (NO in step S1105), the processing proceeds to step S1107.

In step S1107, the job control unit 110 determines whether the record is formed from only one page. If it is determined that the record is formed from only one page (YES in step S1107), the processing proceeds to step S1111. On the other hand, if it is determined that the record is not formed from only one page (NO in step S1107), the processing returns to step S1102.

If it is determined in step S1103 that the next page is the end page (END in step S1103), the processing proceeds to step S1111.

In step S1111, the job control unit 110 determines whether the record skip flag is set to TRUE. If it is determined that the record skip flag is set to TRUE (YES in step S1111), in step S1112, the job control unit 110 skips printing of all the pages included in the processing target record, and then finishes the print processing. On the other hand, if it is determined that the record skip flag is not set to TRUE (NO in step S1111), in step S1113, the job control unit 110 prints all the pages included in the processing target record, and then finishes the print processing.

Figure 12:
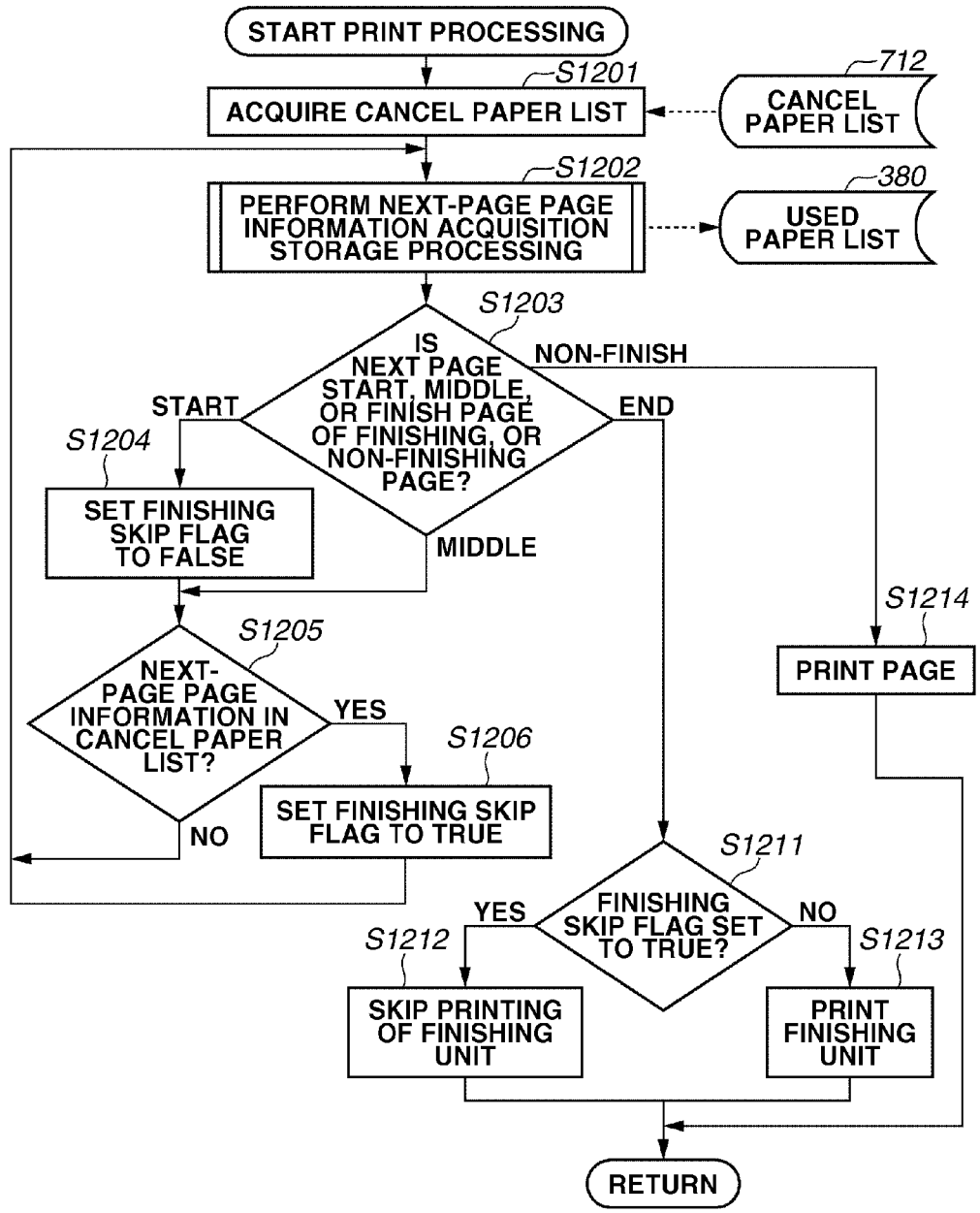
FIG. 12 illustrates an example of a flowchart relating to print processing.

FIG. 12 illustrates an example of a flowchart relating to print processing performed by the job control unit 110 in the printing apparatus 1000. However, FIG. 12 illustrates an example in which "finishing" is selected as the cancellation unit on the UI illustrated in FIG. 10. The print processing will now be described based on the flowchart illustrated in FIG. 12.

First, in step S1201, the job control unit 110 acquires the cancel paper list 712 from the external memory 30. In this example, the cancel paper list 712 includes the cancellation unit information "finishing". The flowchart illustrated in FIG. 12 illustrates the print processing that is performed when the cancellation unit is specified as "finishing".

Then, in step S1202, the job control unit 110 performs next-page page information acquisition storage processing. In the next-page page information acquisition storage processing, as described above, the job control unit 110 acquires the page information about the next page of the job currently being printed.

In step S1203, the job control unit 110 determines whether the next page is a start page, a mid-page, an end page of the finishing, or a non-finishing page which is not included in the finishing, based on information indicating a separation of finishing included in the job.

If it is determined that the next page is a start page (START in step S1203), in step S1204, the job control unit 110 sets a finishing skip flag to FALSE, and the processing then proceeds to step S1205.

If it is determined that the next page is a mid page (MIDDLE in step S1203), the processing proceeds to step S1205.

In step S1205, the job control unit 110 determines whether the next-page page information (information about the paper) is included in the cancel paper list 712 by referring to the acquired page information and the cancel paper list 712 acquired in step S1201. If it is determined that the next-page page information is included in the cancel paper list 712 (YES in step S1205), in step S1206, the job control unit 110 sets the finishing skip flag to TRUE, and the processing returns to step S1202. On the other hand, if it is determined that the next-page page information is not included in the cancel paper list 712 (NO in step S1205), the processing returns to step S1202.

If it is determined that the next page is the end page (END in step S1203), the processing proceeds to step S1211. In step S1211, the job control unit 110 determines whether the finishing skip flag is set to TRUE. If it is determined that the finishing skip flag is set to TRUE (YES in step S1211), in step S1212, the job control unit 110 skips printing of all the pages included in the finishing unit, and then finishes the print processing. On the other hand, if it is determined that the record skip flag is not set to TRUE (NO in step S1211), in step S1213, the job control unit 110 prints all the pages included in the finishing unit, and then finishes the print processing.

If it is determined in step S1203 that the next page is a non-finishing page (NON-FINISH in step S1203), in step S1214, the job control unit 110 prints that page, and then finishes the print processing.

According to the above-described exemplary embodiment, the user can perform printing cancellation in easy-to-handle units, and it is also easier for the user to subsequently replace a part of the cancelled job.

Additionally, in VDP, the order in which the records are to printed is meaningless, so that sometimes it is simply enough if all of the records are printed. According to the present exemplary embodiment, in such a case, if the paper was set in the wrong paper feed stage, printing can be cancelled for just the portion using the wrong paper feed stage, and that portion can be reprinted later. Therefore, a situation in which printing productivity substantially decreases can be avoided.

In the first and second exemplary embodiments, examples are described in which only one type of paper could be specified for printing cancellation. However, in an actual practice, the user may find a plurality of paper setting mistakes during printing. For example, the user may find one paper setting mistake, and then subsequently realize that a different paper is also mistakenly set. In such a case, an issue arises that cannot be handled by the first and second exemplary embodiments.

Therefore, in a third exemplary embodiment, an example of a configuration is described which can solve this issue. In the present exemplary embodiment, parts having the same configuration as in the first exemplary embodiment are denoted using the same reference numerals, and a description thereof is omitted as appropriate.

Figure 13:
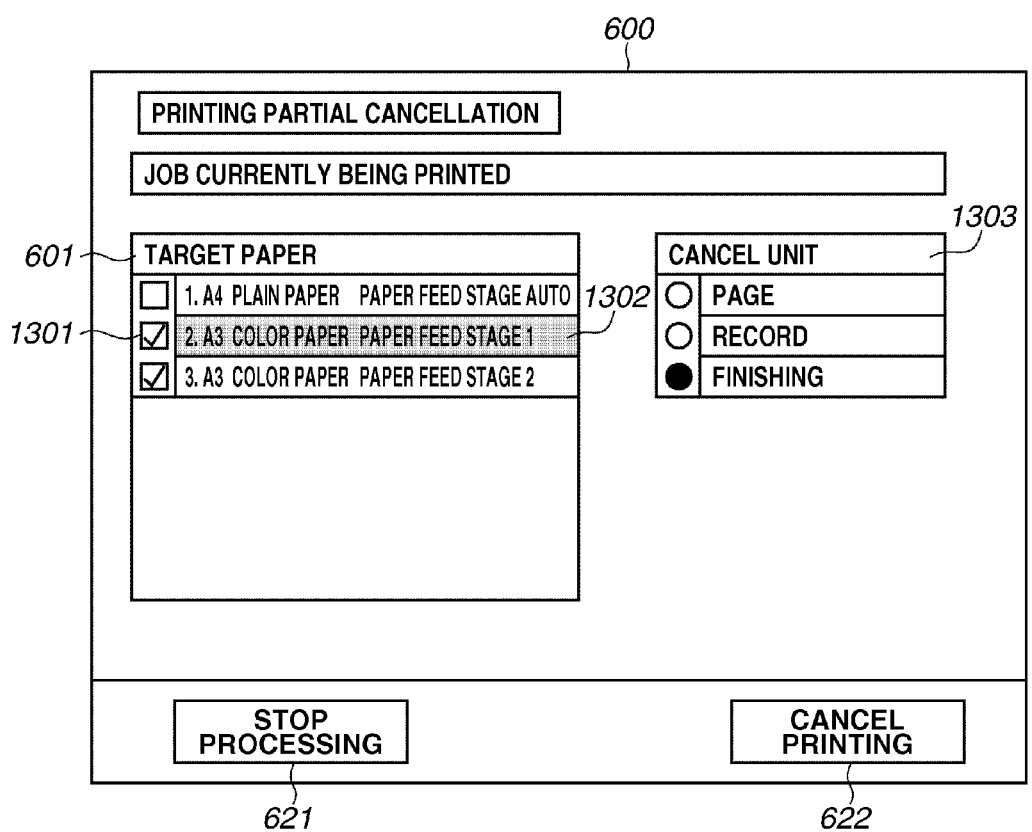
FIG. 13 illustrates an example of a UI.

FIG. 13 illustrates an example of a UI for instructing printing cancellation (i.e., the cancel specification screen 600).

A check button 1301 is an example of a UI that can be used to select a plurality of information pieces about cancellation target paper. The check button 1301 allows the user to make subsequent additional selections if there is already information about selected paper.

A list display section 1302 allows the user to select information about the cancellation unit for each paper without changing the check state of the check button 1301 by selecting the information about the paper. FIG. 13 illustrates a state in which paper No. 2 (paper 2) "A3/color paper/paper feed stage 1" is selected.

An input area 1303 can be used by the user to select information about the cancellation unit for the paper selected in the list display section 1302. The respective paper cancellation units are as described in the second exemplary embodiment.

Figure 14:
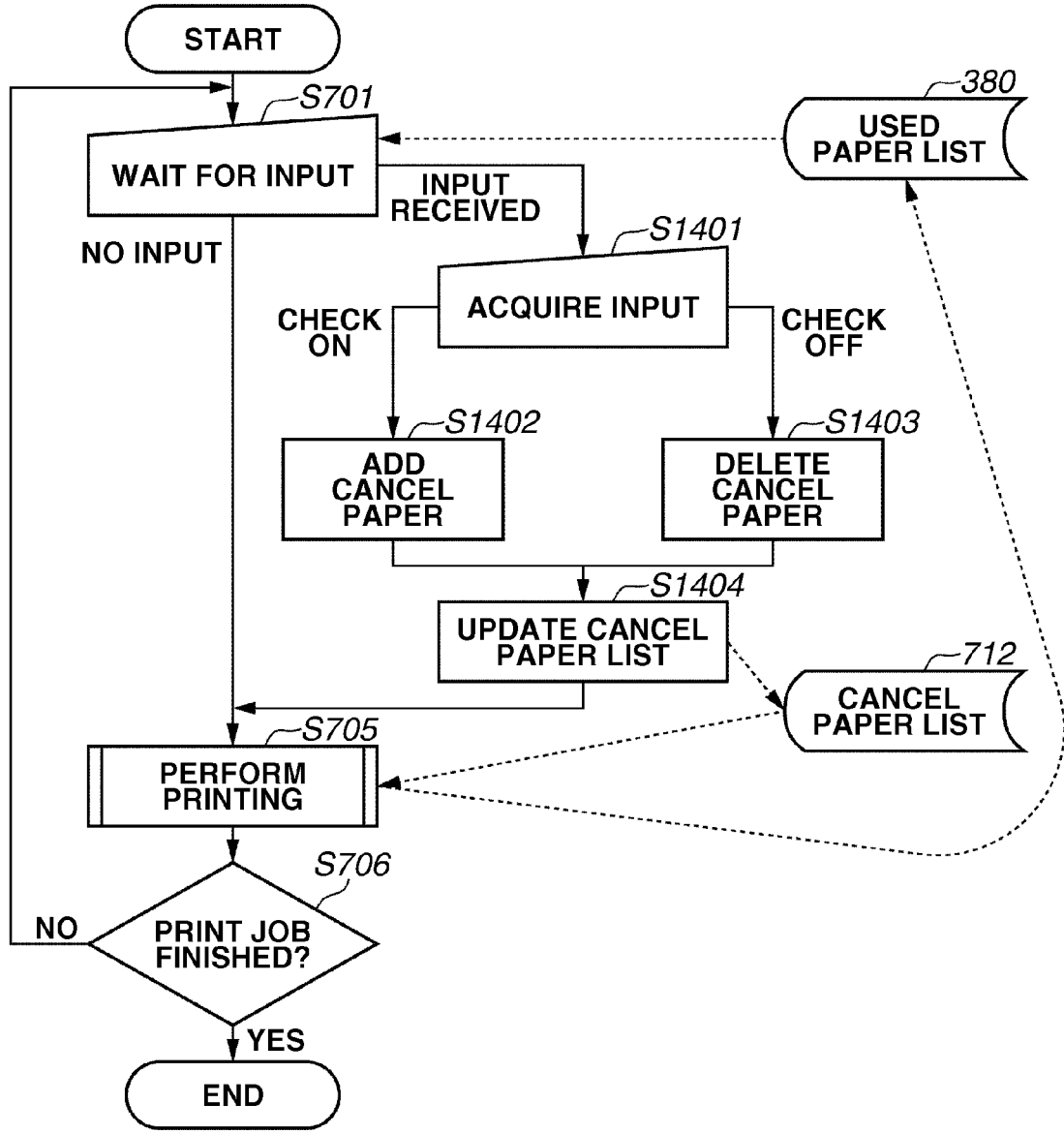
FIG. 14 illustrates an example of a flowchart relating to partial cancellation processing.

FIG. 14 illustrates an example of a flowchart relating to partial cancellation processing for cancelling a part of printing for one job by the printing apparatus 1000.

In step S1401, when an input result is acquired, the UI control unit 120 determines whether the input result indicates that the checkbox is set to ON or OFF.

If it is determined that the checkbox is checked ("CHECK ON" in step S1401), then in step S1402, the UI control unit 120 specifies the information about the checked paper to be added to the cancel paper list 712. On the other hand, if it is determined that the checkbox is not checked ("CHECK OFF" in step S1401), then in step S1403, the UI control unit 120 specifies the information about the unchecked paper to be deleted from the cancel paper list 712.

Although not illustrated in FIG. 14, if the UI control unit 120 determines that the cancel printing button 622 is pressed, the processing proceeds to step S1404. If the UI control unit 120 determines that the cancel printing button 622 is not pressed, the UI control unit 120 continues the processing in step S705.

In step S1404, the UI control unit 120 updates the cancel paper list 712 using the information about the paper specified in step S1402 or S1403.

According to the above-described configuration, the user can specify the paper for which printing is to be cancelled whenever the user realizes during printing that the wrong paper was set. Further, the user can simultaneously specify a plurality of types of paper.

In the first to third exemplary embodiments, if the paper feed stage information (an example of paper feed unit information) included in the page data is automatic (Auto), the information is stored in the cancel paper list 712 as "automatic". However, the paper used to print the page specified as A4/plain paper/paper feed stage 1 in the job and the paper used to print the page specified as A4/color paper/Auto can, as it turns out, be fed from the same paper feed stage 1. In such a case, in the above described exemplary embodiments, there is the issue that if the user set the wrong paper in the paper feed stage 1, the user has to specify both of these settings in the specification of the paper to be cancelled.

In a fourth exemplary embodiment, an example of a configuration is described which can solve this issue. In the present exemplary embodiment, parts having the same configuration as in the first exemplary embodiment are denoted using the same reference numerals, and a description thereof is omitted as appropriate.

FIG. 15 illustrates an example of a flowchart relating to next-page page information acquisition storage processing performed by the job control unit 110 in the printing apparatus 1000.

In step S901, the job control unit 110 acquires the next-page page information for the current job that is being printed. Then, in step S1501, the job control unit 110 determines whether the paper feed stage information in the acquired next-page page information is specified as "automatic paper feed stage".

If it is determined that the paper feed stage information is specified as "automatic paper feed stage" (YES in step S1501), the job control unit 110 acquires information about the paper size from the next-page page information. In addition, the job control unit 110 acquires setting information (information about the paper feed stage of the paper) set for the paper feed stages (161 to 165) of the actual printer engine 160 via the printer control unit 150. Then, in step S1502, the job control unit 110 determines information about the optimum paper feed stage from the setting information based on the information about the paper size, and converts the "automatic paper feed stage" into information about one paper feed stage. Generally, in a printing apparatus, if there is an automatic paper feed stage, there is a rule regarding the priority for selecting the paper feed stage that is based on the device configuration. Therefore, the job control unit 110 determines the information about the optimum paper feed stage based on this rule.

According to the above configuration, rather than using a parameter called "automatic paper feed stage" (Auto), information about the paper indicating the actual paper feed stage is used. Consequently, the user just needs to specify cancellation for only the paper that was put in the wrong paper feed stage, so that the printing cancellation efficiency is further improved.

As another exemplary embodiment, an exemplary embodiment may be employed that combines the first to fourth exemplary embodiments. Further, in the above-described exemplary embodiments, although information about one or a plurality of types of paper used in printing is added to the used paper list, the present invention is not limited to this configuration. For example, instead of this configuration, a configuration may be employed which generates the used paper list by acquiring information about one or a plurality of types of paper to be used in printing from the job at an appropriate timing.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-045474 filed Mar. 2, 2011, which is hereby incorporated by reference herein in its entirety.

What is claimed is:

1. A printing apparatus comprising:
a receiving unit configured to receive at least one attribute of paper to be skipped without printing among attributes of a plurality of types of paper set for paper feed units; and
a printing unit configured to, based on the attribute received by the receiving unit, print a page that does not use paper having the attribute, and skip printing of a page that uses paper having the attribute.

2. The printing apparatus according to claim 1,
wherein the receiving unit is further configured to receive information about a unit of processing for which printing of a page that uses paper having the attribute is not performed, and
wherein the printing unit is configured not to print a page that uses paper having the attribute for the processing unit.

3. A printing apparatus comprising:
a receiving unit configured to receive an attribute of paper to be skipped without printing,
wherein the receiving unit is further configured to receive information about another attribute which is different from the attribute; and
a printing unit configured to, based on the attribute received by the receiving unit, print a page that does not use paper having the attribute, and skip printing of a page that uses paper having the attribute,
wherein the printing unit is further configured to skip printing of a page that uses paper having the other attribute.

4. The printing apparatus according to claim 1, further comprising:
a storage unit configured to store one or a plurality of attributes of paper to be used in printing or of paper that was used in printing in a storage device,
wherein the receiving unit is configured to display on a display unit information about the one or plurality of attributes, and receive information specified in response to a user operation from among information about the one or plurality of attributes as the attribute.

5. The printing apparatus according to claim 4,
wherein the information about the one or plurality of attributes includes paper feed unit information for specifying a paper feed unit to be used in printing from among a plurality of paper feed units, and
wherein the storage unit is configured to, if the paper feed unit information is information indicating that the paper feed unit is to be automatically determined from among the plurality of paper feed units, convert the paper feed unit information into information that indicates one paper feed unit from among the plurality of paper feed units, and store the converted information in the attribute.

6. A method for controlling printing, the method comprising:
receiving at least one attribute of paper to be skipped without printing among attributes of a plurality of types of paper set for paper feed units; and
based on the received attribute, printing a page that does not use paper having the attribute, and skipping printing of a page that uses paper having the attribute.

7. The method according to claim 6, further comprising:
receiving information about a unit of processing for which printing of a page that uses paper having the attribute is not performed; and
not printing a page that uses paper having the attribute for the processing unit.

8. A method for controlling printing, the method comprising:
receiving an attribute of paper to be skipped without printing;
based on the received attribute, printing a page that does not use paper having the attribute, and skipping printing of a page that uses paper having the attribute;
receiving information about another attribute which is different from the attribute; and
skipping printing of a page that uses paper having the other attribute.

9. The method according to claim 6, further comprising:
storing one or a plurality of attributes of paper to be used in printing or of paper that was used in printing in a storage device;
displaying on a display unit information about the one or plurality of attributes; and
receiving information specified in response to a user operation from among information about the one or plurality of attributes as the attribute.

10. The method according to claim 9,
wherein the information about the one or plurality of attributes includes paper feed unit information for specifying a paper feed unit to be used in printing from among a plurality of paper feed units, and
wherein, if the paper feed unit information is information indicating that the paper feed unit is to be automatically determined from among the plurality of paper feed units, the paper feed unit information is converted into information that indicates one paper feed unit from among the plurality of paper feed units, and the converted information is stored in the attribute.

11. A non-transitory computer-readable storage medium storing a program that causes a computer to function as:
   a receiving unit configured to receive at least one attribute of paper to be skipped without printing among attributes of a plurality of types of paper set for paper feed units; and
   a printing unit configured to, based on the attribute received by the receiving unit, print a page that does not use paper having the attribute, and skip printing of a page that uses paper having the attribute.

12. The computer-readable storage medium according to claim 11, wherein the program further causes the computer to function as:
   the receiving unit configured to receive information about a unit of processing for which printing of a page that uses paper having the attribute is not performed; and
   the printing unit configured not to print a page that uses paper having the attribute for the processing unit.

13. A non-transitory computer-readable storage medium storing a program that causes a computer to function as:
   a receiving unit configured to receive an attribute of paper to be skipped without printing;
   a printing unit configured to, based on the attribute received by the receiving unit, print a page that does not use paper having the attribute, and skip printing of a page that uses paper having the attribute,
   wherein the program further causes the computer to function as:
      the receiving unit configured to receive information about another attribute which is different from the attribute; and
      the printing unit configured to skip printing of a page that uses paper having the other attribute.

14. The computer-readable storage medium according to claim 11, wherein the program further causes the computer to function as:
   a storage unit configured to store one or a plurality of attributes of paper to be used in printing or of paper that was used in printing in a storage device; and
   the receiving unit configured to display on a display unit information about the one or plurality of attributes, and receive information specified in response to a user operation from among information about the one or plurality of attributes as the attribute.

15. The computer-readable storage medium according to claim 14,
   wherein the information about the one or plurality of attributes includes paper feed unit information for specifying a paper feed unit to be used in printing from among a plurality of paper feed units, and
   wherein the computer further functions as the storage unit configured to, if the paper feed unit information is information indicating that the paper feed unit is to be automatically determined from among the plurality of paper feed units, convert the paper feed unit information into information that indicates one paper feed unit from among the plurality of paper feed units, and store the converted information in the attribute.

16. The printing apparatus according to claim 1 further comprising a displaying unit configured to display the plurality of attributes of paper.

* * * * *